US009623638B2

(12) United States Patent
Lungershausen et al.

(10) Patent No.: US 9,623,638 B2
(45) Date of Patent: Apr. 18, 2017

(54) SKIN COMPONENT FOR A VEHICLE

(71) Applicant: GM GLOBAL TECHNOLOGY OPERATIONS LLC, Detroit, MI (US)

(72) Inventors: Dirk Lungershausen, Wiesbaden, DE (US); Tino Jacob, Leipzig (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 63 days.

(21) Appl. No.: 14/550,480

(22) Filed: Nov. 21, 2014

(65) Prior Publication Data

US 2015/0147536 A1 May 28, 2015

(30) Foreign Application Priority Data

Nov. 22, 2013 (DE) .................. 10 2013 019 677

(51) Int. Cl.
*B32B 27/12* (2006.01)
*B62D 29/04* (2006.01)
(Continued)

(52) U.S. Cl.
CPC ............ *B32B 27/12* (2013.01); *B29C 70/088* (2013.01); *B32B 5/26* (2013.01); *B32B 7/005* (2013.01); *B62D 29/043* (2013.01); *B29C 70/48* (2013.01); *B29K 2101/10* (2013.01); *B29K 2301/12* (2013.01); *B29K 2305/00* (2013.01);
(Continued)

(58) Field of Classification Search
CPC ..... B29C 70/48; B29C 70/088; B62D 29/043; B62D 25/06; B62D 29/04; B32B 2260/021; B32B 2260/046; B32B 2262/02; B32B 2262/06; B32B 2262/101; B32B 2262/103; B32B 2262/106; B32B 2605/00; B32B 27/12; B32B 5/26; B32B 7/005; Y10T 428/24752; Y10T 428/249934; Y10T 428/249929; Y10T 428/249942; Y10T 428/249947; Y10T 428/24995; Y10T 428/249939; B60R 13/01; B60R 13/011; B60R 13/02; B60R 13/0212
USPC .. 428/31, 297.4, 297.7, 298.1, 300.7, 301.4, 428/189; 296/181.2, 210
See application file for complete search history.

(56) References Cited

U.S. PATENT DOCUMENTS 6,479,124 B1 11/2002 Porte et al.
7,897,239 B2 3/2011 Koon et al.
(Continued)

FOREIGN PATENT DOCUMENTS

| CA | 1221611 A | 5/1987 | |
|---|---|---|---|
| EP | 1162058 | 12/2001 | |
| EP | 2085215 A1 * | 8/2009 | ............ B32B 15/14 |
| WO | 2010006718 A1 | 1/2010 | |

OTHER PUBLICATIONS

German Patent Office, German Search Report for German Application No. 102013019677.9, dated Sep. 18, 2014.
(Continued)

*Primary Examiner* — Catherine A Simone
(74) *Attorney, Agent, or Firm* — Lorenz & Kopf, LLP

(57) ABSTRACT

A skin component for a vehicle for use as a roof module, an engine compartment hood or a trunk lid is disclosed. The skin component includes at least one supporting layer and a protective layer. The protective layer includes a fiber-reinforced band that is installed along at least one outer edge of the skin component.

13 Claims, 1 Drawing Sheet

(51) Int. Cl.
- *B29C 70/08* (2006.01)
- *B32B 5/26* (2006.01)
- *B32B 7/00* (2006.01)
- *B29C 70/48* (2006.01)
- *B29L 9/00* (2006.01)
- *B29L 31/30* (2006.01)
- *B29K 101/10* (2006.01)
- *B29K 301/12* (2006.01)
- *B29K 305/00* (2006.01)

(52) U.S. Cl.
CPC ....... *B29L 2009/00* (2013.01); *B29L 2031/30* (2013.01); *B32B 2260/021* (2013.01); *B32B 2260/046* (2013.01); *B32B 2262/02* (2013.01); *B32B 2262/06* (2013.01); *B32B 2262/101* (2013.01); *B32B 2262/103* (2013.01); *B32B 2262/106* (2013.01); *B32B 2605/00* (2013.01); *Y10T 428/24752* (2015.01)

(56) References Cited

U.S. PATENT DOCUMENTS

| | | |
|---|---|---|
| 8,511,742 B2 | 8/2013 | Legler et al. |
| 8,862,332 B2 | 10/2014 | Dolan et al. |
| 2011/0101731 A1* | 5/2011 | Legler .................. B32B 27/40 296/181.2 |

OTHER PUBLICATIONS

Great Britain Patent Office, Great Britain Search Report for Great Britain Application No. 1419847.7, dated Jun. 15, 2015.

Herstellung von belastungsoptimierten UDendlosfaserverstarkten Thermoplast—Bauteilen (English translation: Production of stress—optimized UDendlosfaserverstärkten thermoplastic components); Neue Verfahren and Dr.-Ing. Michael Emonts.

Langfaserverstärkte Thermoplaste mit UD-Fasertapes kombiniert (English translation: Long fiber reinforced thermoplastics UD fiber tapes combine); Josef Kraus; 2012.

* cited by examiner

SKIN COMPONENT FOR A VEHICLE

CROSS REFERENCE TO RELATED APPLICATION

This application claims priority to German Patent Application No. 102013019677.9 filed Nov. 22, 2013, which is incorporated herein by reference in its entirety.

TECHNICAL FIELD

The present disclosure relates to a skin component for a vehicle, particularly a roof module, an engine compartment hood or a trunk lid of a composite material that includes a thermosetting polymer matrix, at least one supporting layer of reinforcing fibers and a protective layer.

BACKGROUND

Plastic parts or composite material parts with a plastic matrix are increasingly utilized for skin panels of vehicles. If composite materials with a thermosetting polymer matrix and high-strength reinforcing fibers are used for stability reasons, a severe impact during an accident may cause the parts to fracture. Large sharp-edged, slab-shaped fragments may be created in such instances. Splinter protection films are occasionally applied onto the skin panels in order to prevent these sharp fracture edges. However, this can lead to problems with respect to the adhesion and the optical appearance.

WO 2010/006718 A1 describes a skin component of plastic, for example, a roof module, in which the splinter protection lies between the layers of the roof structure. The skin component includes a first supporting layer, a splinter protection fabric, a core layer, a second supporting layer, a splinter protection fabric, a decoupling layer and a skin. The connection between the individual layers is produced in a CMS process. The structure of the skin component with a plurality of layers and the connection between the layers by means of a CMS process are elaborate and expensive.

SUMMARY

In accordance with the present disclosure, skin components of plastic, particularly of composite materials, can be designed in such a way that an effective splinter protection can be realized with little effort. According to an embodiment of the present disclosure, a skin component for a vehicle includes at least one supporting layer and one protective layer. The protective layer includes a fiber-reinforced band that is installed along at least one outer edge of the skin component. The band provides effective protection against mechanical stresses that originate from the edge of the skin component with little material input. In contrast to fabric webs that cover the entire surface of the skin component, scrap can almost be completely eliminated. The total quantity of fibers used for the protective layer therefore is so small that the overall skin component can also be cost-effectively manufactured if expensive high-quality fibers are used in the protective layer.

The fibers of the protective layer may be arranged between two supporting layers. In this way, a stable integration of the protective layer into the skin component is achieved and the component surface is not optically affected. The fibers of the protective layer may include a pre-stretched thermoplastic polymer or steel. Fabrics can be subjected to high stresses in the intact state, but once damage has occurred under a load and initial fibers have been torn, the fibers extending transverse to the torn fibers cause a concentration of the load on a small area and thusly promote a propagation of the tear. The fibers of the protective layer may not be interwoven in order to prevent such a load concentration. The fibers may be oriented, in particular, in the longitudinal direction of the band in order to divert a load along the edges of the skin component without tearing.

The band may be impregnated with a thermosetting polymer matrix of the at least one supporting layer after the completion of the skin component. This can be achieved, in particular, with a loose band of fibers that are not connected to one another. It is more convenient to install a band, the fibers of which are held together by being embedded in a separate matrix or carrier layer of the band. Such a matrix may be fused together with a thermosetting polymer matrix of the at least one supporting layer after the completion of the skin component.

The supporting layer may likewise be reinforced with fibers, but the requirements with respect to the strength of these fibers are not as strict as with the fibers of the protective layer and this can be taken into account in the concentration of the fibers in the matrix, their length and/or their chemical composition. The fibers of the supporting layer may consist, in particular, of carbon fibers, glass fibers or natural fibers of plant origin. The fibers of the supporting layer may be structured in the form of a fabric in order to simplify their handling during the manufacture of the skin component. The fibers of the supporting layer may be pre-impregnated (prepreg fibers). The manufacture of the skin component may be realized by means of infiltration of the supporting layer and the protective layer with a thermosetting polymer matrix, by means of resin-transfer-molding (RTM) processes or by means of gap impregnation. In this way, the fibers of the protective layer are completely enclosed by the matrix.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
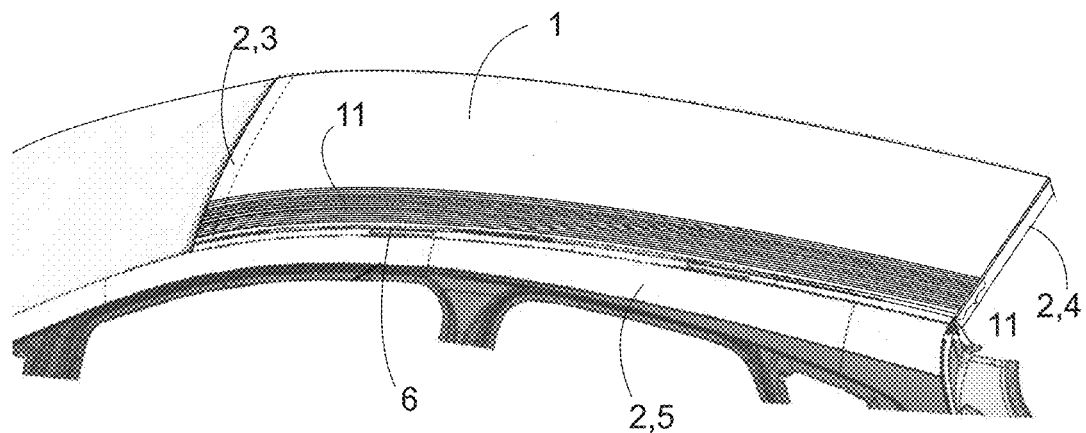
FIG. 1 shows a perspective view of the upper part of a vehicle with a roof module.

FIG. 1 shows a perspective view for part of the roof area of a car body. A roof frame 2 includes lateral profiles that extend above the doors on the right and the left side of the vehicle and connect A-columns and C-columns to one another, as well as front and rear cross members 3, 4. FIG. 1 only shows one of the two lateral profiles. The front cross member 3 extends underneath the roof module 1 adjacent to a front windshield as indicated with a broken line; the rear cross member 4 extends underneath the rear edge of the roof module 1.

The roof module 1 is a composite component including several layers. It includes at least one supporting layer that extends over the entire roof module 1, as well as a protective layer 11 that extends along the edge of the roof module 1 in the form of a strip, but not over the center of the roof module 1.

In the embodiment according to FIG. 1, a strip of the protective layer 11 extends along a left outer edge 6 of the roof module 1 that faces the viewer as shown and a second strip extends along the right outer edge that is not illustrated in FIG. 1. These are the outer edges that are in contact with the profiles 5 and therefore most fracture-prone in an accident. Other not-shown strips of the protective layer 11 may be provided on the front and rear edges of the roof module 1.

Figure 2:
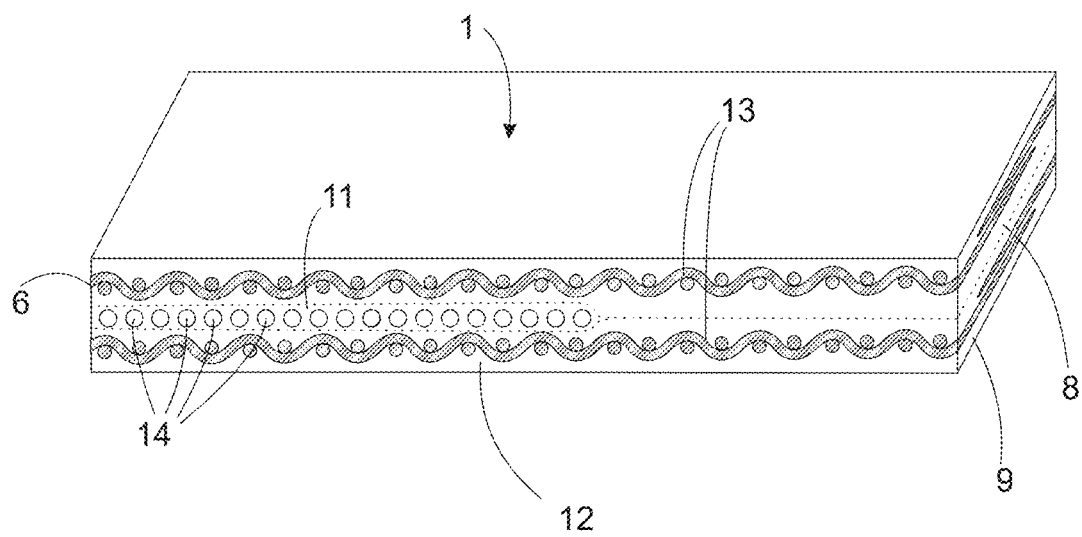
FIG. 2 shows a detail of the roof module in the region of the outer edge.

FIG. 2 shows a schematic cross section through the roof module 1 in the vicinity of the outer edge 6. In this case, the roof module 1 includes two supporting layers 8, 9 that directly contact one another in a central region of the roof module 1, wherein the protective layer 11 extends between these two supporting layers adjacent to the edge.

The first and the second supporting layer 8, 9 respectively include a fabric 13, the threads of which includes high-strength carbon fibers, glass fibers and/or plant fibers. The fabric 13 could also be replaced with a formed fabric of unspun fibers. The fabric 13 is embedded in a thermosetting polymer matrix 12. An epoxy resin, a polyester resin or a polyurethane, in particular, may be considered as thermosetting polymer of the matrix 12.

In this case, the protective layer 11 includes fibers 14 that are aligned parallel to the edge 6. These fibers 14 were originally placed between the fabrics 13 of the supporting layers 8, 9 without being firmly connected to one another, e.g. in the form of a longitudinally combed formed fabric, and then impregnated with the thermosetting polymer matrix 12 together with the fabrics of the supporting layers so as to obtain the roof module 1. In order to simplify the impregnation, the fibers 14 of the protective layer 11, as well as of the supporting layers 8, 9, may be pre-impregnated, i.e. includes so-called prepreg fibers.

The fibers 14 of the protective layer 11 need to have a high elongation at fracture. Consequently, they preferably include a pre-stretched thermoplastic polymer, particularly of polyethylene (PE), polypropylene (PP), polyethylene terephthalate (PET) and/or of a steel.

In order to simplify the installation, the protective layer 11 may in addition to the fibers 14 also contain a band of a carrier material, in which the fibers 14 are embedded or onto which they are glued. The protective layer may particularly include so-called UD-tape. After the impregnation with the matrix 12, the carrier material may be intimately glued or fused thereto such that it cannot be distinguished from this matrix in the illustration in FIG. 2.

Different layer structures are contemplated in the present disclosure, including: a single supporting layer 8; a supporting layer 8 including several fiber fabrics lying on top of one another on at least one side of the protective layer 11; a protective layer 11 respectively realized between several supporting layer is 8, 9; a protective layer 11 formed on the outermost layer of the roof module 1.

If the roof module 1 is subjected to a load that originates from one of the lateral profiles 5 during a side impact, cracks may indeed form in the matrix 12 and fibers or entire threads of the supporting layers 8, 9 may possibly also be destroyed, but the fibers 14 of the protective layer 11 do not break, but rather deform in an elasto-plastic fashion. This prevents propagation of the cracks and the flanks of the cracks are held close to one another. Individual fragments of the roof module 1 cannot separate. This furthermore prevents sharp corners and edges that could protrude from the roof module 1.

Fibers of the protective layer 11 may also be arranged along the outer edge 6 of the roof module 1 along the front and the rear roof frame 3, 4. The composite material structure chosen for the roof module 1 may likewise be used for other skin components such as an engine compartment hood, a trunk lid, fenders and doors. In this case, the fibers of the protective layer 11 extend along the outer edges of the component that are particularly stressed and fracture-prone during an impact due to an accident. However, they may also cover other fracture-prone component areas.

The manufacture of the roof module 1 takes place in the following steps. The fiber fabric 13 of the supporting layer 8 are placed into a mold for the roof module 1. The fibers of the protective layer 11 are placed individually, adjacently or in the form of unidirectional fiber bands such as UD-tapes. The fiber fabric of the second supporting layer 9 are placed thereon. The supporting layers 8, 9 are infiltrated or interwoven with the protective layer 11 with a thermosetting polymer matrix 12 in a resin-transfer-molding (RTM) process or by means of gap impregnation. If a different layer structure is chosen, the placement of the layers 8, 9, 11 into the mold is carried out accordingly prior to the infiltration of the layers.

In a first variation, the fiber fabric of the supporting layers 8, 9 is composed of pre-impregnated fibers (prepreg fibers). The impregnation includes a resin and a hardener that react to form a thermosetting polymer during processing. Preferred thermosetting polymers are epoxy resin, polyester resin or polyurethane. Hot-pressing of the layers in a mold or autoclave causes the impregnation to react, as well as to interfuse and completely enclose the supporting layers 8, 9 and the protective layer 11, such that the matrix 12 is formed.

In a first variation, the manufacture of the roof module 1 takes place in the following steps. The pre-impregnated fiber fabric of the supporting layer 8 are placed into the mold for the roof module 1. The fibers of the protective layer 11 are placed individually, adjacently or in the form of unidirectional fiber bands such as UD-tapes. The impregnated fiber fabric of the second supporting layer 9 are placed thereon. The layers 8, 9, 11 are hot-pressed in the mold or in an autoclave.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:
1. A skin component for a vehicle, comprising:
   at least one supporting layer and a protective layer,
   wherein the at least one supporting layer comprises two supporting layers, the protective layer is arranged between the two supporting layers and the protective layer includes a fiber-reinforced band that is installed along at least one outer edge of the skin component, the fiber-reinforced band of the protective layer includes a plurality of fibers, with each of the fibers aligned substantially parallel to the at least one outer edge of the skin component and the two supporting layers directly contact each other at a distance from the at least one outer edge.

2. The skin component according to claim 1, wherein the fibers of the protective layer comprises at least one of a pre-stretched thermoplastic polymer and steel.

3. The skin component according to claim 1, wherein the fibers of the protective layer are not interwoven.

4. The skin component according to claim 1, wherein the fibers of the protective layer are oriented in a longitudinal direction of the fiber-reinforced band.

5. The skin component according claim 1, wherein the protective layer is a fiber layer impregnated with a thermosetting polymer matrix of the at least one supporting layer.

6. The skin component according to claim 1, wherein the protective layer comprises a matrix fused together with a thermosetting polymer matrix of the at least one supporting layer.

7. The skin component according claim 1, wherein the supporting layer further comprises reinforcing fibers including at least one of a carbon fiber, a glass fiber or a plant-based fiber.

8. The skin component according to claim 7, wherein the reinforcing fibers of the supporting layer comprise a fabric.

9. The skin component according to claim 1, wherein the supporting layer comprises pre-impregnated fibers.

10. The skin component according to claim 1, wherein the skin component comprises one of a roof module, an engine compartment hood or a trunk lid.

11. A method for fabricating a skin component according to claim 1 comprising interweaving the supporting layer and the protective layer with a thermosetting polymer matrix using a resin-transfer-molding (RTM) process.

12. A method for fabricating a skin component according to claim 1 comprising interweaving the supporting layer and the protective layer with a thermosetting polymer matrix using a gap impregnation process.

13. The skin component according to claim 1, wherein the fibers of the protective layer comprise a pre-stretched thermoplastic polymer and the fibers of the protective layer deform in an elasto-plastic manner.

* * * * *